(12) United States Patent
Kocharyan

(10) Patent No.: US 12,470,534 B2
(45) Date of Patent: Nov. 11, 2025

(54) PARTIAL POOL CREDENTIALING AUTHENTICATION SYSTEM

(71) Applicant: BANK OF AMERICA CORPORATION, Charlotte, NC (US)

(72) Inventor: Olga Kocharyan, Matthews, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 253 days.

(21) Appl. No.: 18/144,380

(22) Filed: May 8, 2023

(65) Prior Publication Data
US 2024/0380740 A1   Nov. 14, 2024

(51) Int. Cl.
H04L 9/40   (2022.01)
(52) U.S. Cl.
CPC .................. H04L 63/08 (2013.01)
(58) Field of Classification Search
CPC ... H04L 63/08; H04L 63/083; H04L 63/0884; H04L 63/10; H04L 67/306; H04L 51/04; H04L 51/52; H04L 63/20; H04L 12/1813; H04L 12/1822; G06Q 50/01; G06F 21/31
See application file for complete search history.

(56) References Cited

U.S. PATENT DOCUMENTS

| | | |
|---|---|---|
| 6,918,035 B1 | 7/2005 | Patel |
| 7,428,638 B1 | 9/2008 | Chen |
| 7,974,234 B2 | 7/2011 | Gustave |
| 8,006,300 B2 | 8/2011 | Mizrah |
| 8,856,879 B2 | 10/2014 | Schechter |
| 8,904,480 B2 | 12/2014 | Castro |
| 8,914,848 B2 | 12/2014 | Castro |
| 9,565,194 B2 | 2/2017 | Nair |
| 9,967,261 B2 | 5/2018 | Liebl, III |
| 9,990,489 B2 | 6/2018 | Hessler |
| 10,013,728 B2 | 7/2018 | Schechter |
| 10,140,600 B2 | 11/2018 | Hessler |
| 10,395,253 B2 | 8/2019 | Hessler |
| 10,489,759 B2 | 11/2019 | Hessler |

(Continued)

FOREIGN PATENT DOCUMENTS

KR   20100137756 A   * 12/2010 ............. G06Q 50/01

Primary Examiner — Alexander Lagor
Assistant Examiner — Brandon Binczak
(74) Attorney, Agent, or Firm — Moore & Van Allen PLLC; Anup Iyer

(57) ABSTRACT

Systems, computer program products, and methods are described herein for partial pool credentialing and authentication. The present invention is configured to receive a user request to access an account within a virtual environment using minimal authentication input from the user. Next, the system determines a set of contacts of the account comprising other accounts within the virtual environment that have a relationship with the user's account. The system may then transmit a request to the contacts for partial authentication credentials associated with the first account. The system then receives submitted partial authentication credentials from the contacts, determines that the submitted partial authentication credentials match the partial authentication credentials associated with the user's account, and authenticates the user to access the first account within the virtual environment. The authentication pool of the user and contacts can be monitored over time for improved security.

13 Claims, 5 Drawing Sheets

(56) References Cited

U.S. PATENT DOCUMENTS

| | | |
|---|---|---|
| 10,864,444 B1 | 12/2020 | Rao |
| 11,429,939 B1* | 8/2022 | Borunda ................ G06Q 20/10 |
| 11,666,829 B1 | 6/2023 | Rao |
| 2004/0123160 A1 | 6/2004 | Mizrah |
| 2004/0225880 A1 | 11/2004 | Mizrah |
| 2005/0177750 A1 | 8/2005 | Gasparini |
| 2013/0133045 A1 | 5/2013 | Hayes |
| 2015/0227728 A1* | 8/2015 | Grigg ................... H04W 4/029 |
| | | 726/4 |
| 2016/0269412 A1* | 9/2016 | Farah ..................... H04L 63/10 |
| 2016/0337348 A1* | 11/2016 | Teng .................... H04L 63/145 |
| 2020/0293638 A1* | 9/2020 | Rose .................. H04L 63/1425 |

\* cited by examiner

PARTIAL POOL CREDENTIALING AUTHENTICATION SYSTEM

FIELD OF THE INVENTION

The present invention embraces a system for partial pool credentialing authentication.

BACKGROUND

Users interacting with virtual environments are often required to authenticate their identity, their accounts, their negotiable instruments, and the like. Some users may not prefer to provide identifiable information, sensitive information, or other information often used to authenticate the user within the virtual environment system. As such, a need exists to allow users to provide a minimal amount of information or data about themselves, their virtual account, or their virtual resources, and still be authenticated to access their virtual account or virtual resources.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for partial pool credentialling authentication. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receive, from a computing device of a user, a request to access a first account within a virtual environment using minimal authentication input from the user, wherein the request comprises a first set of authentication credentials associated with the user. The system may then confirm the first set of authentication credentials matches a set of known authentication credentials of the first account. Next, the system determines a set of contacts of the first account comprising other accounts within the virtual environment that have a relationship with the first account. In some embodiments, the system may then transmit a request for partial authentication credentials associated with the first account to computing devices of the set of contacts of the first account. The system may then receive, from the computing devices of the set of contacts of the first account, submitted partial authentication credentials. Further, the system may determine that the submitted partial authentication credentials match the partial authentication credentials associated with the first account, and authenticate the user to access the first account within the virtual environment.

The first set of authentication credentials associated with the user may, in some embodiments, comprise one or more of a username for the first account, a personal identification number associated with the first account, contact information associated with the first account, a prompt for one or more of the set of contacts of the first account to respond to.

Additionally or alternatively, the submitted partial authentication credential comprises one or more of a personal identification number associated with the first account, contact information associated with the first account, a prompt for one or more of the set of contacts of the first account to respond to, a response to a prompt provided by the user, acknowledgement or rejection of a previous interaction within the virtual environment between the first account and one or more of the set of contacts of the first account.

In some embodiments of the invention, the system may then track multiple instances of partial authentication credentialing for the first account over a period of time. The system may then determine an occurrence of a change event associated with the partial authentication credentialing for the first account.

The change event may, in some embodiments, comprise a change in the set of contacts of the first account providing the supplemental credentials.

Additionally or alternatively, the change event may comprise a detection of a potentially compromised account associated with one of the set of contacts of the first account.

In response to determining the occurrence of the change event, the system may reject the request to access the first account within the virtual environment using minimal authentication input from the user.

In response to determining the occurrence of the change event, the system may establish an authentication credential threshold that is higher than a standard authentication credential threshold. In some such embodiments, establishing an authentication credential threshold that is higher than a standard authentication credential threshold may comprise expanding a number of contacts in the set of contacts of the first account to provide partial credentials. Additionally or alternatively, establishing an authentication credential threshold that is higher than a standard authentication credential threshold may comprises requiring the set of contacts of the first account to provide additional or more rigorous partial credentials.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
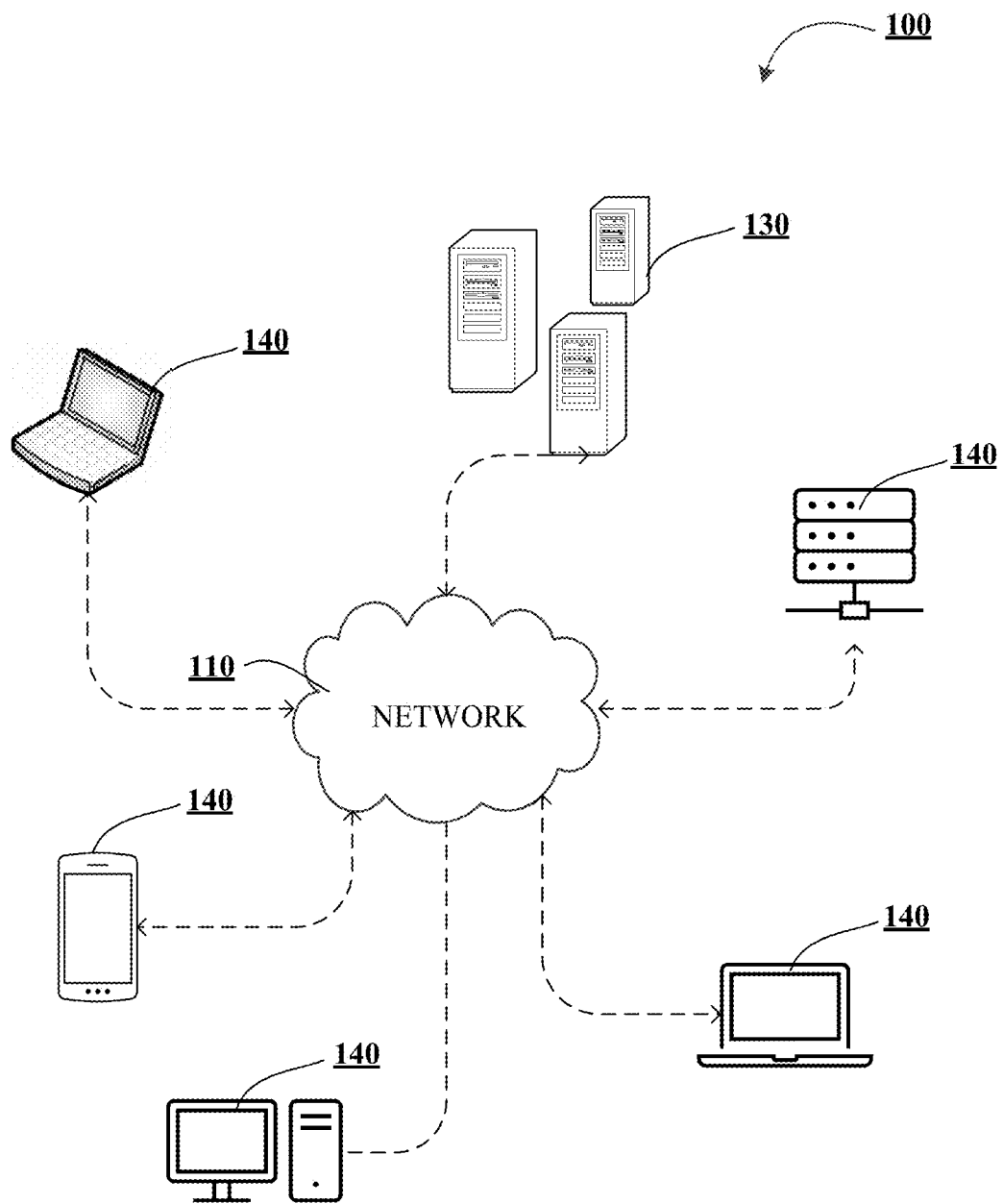
Figure 1B:
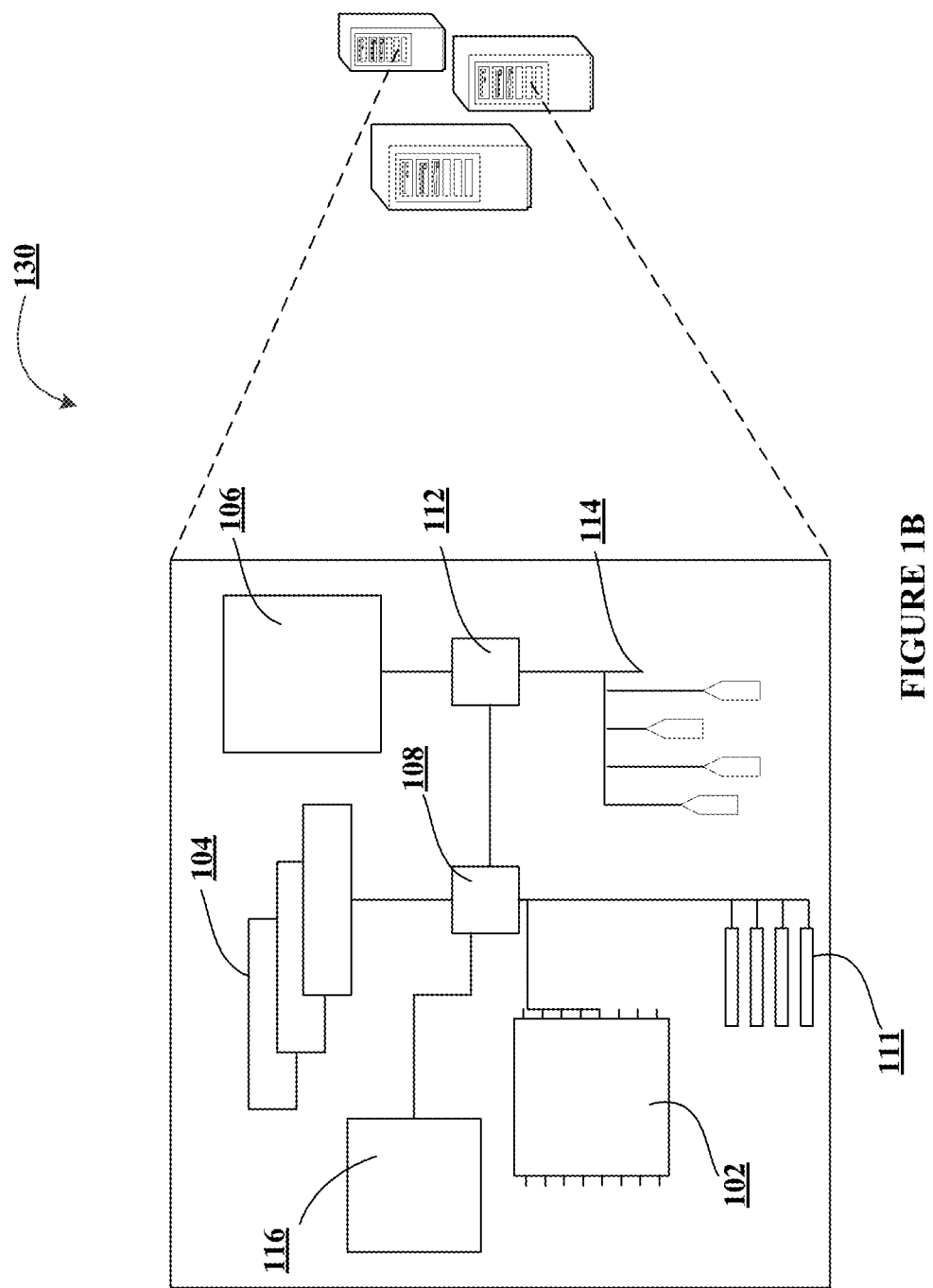
Figure 1C:
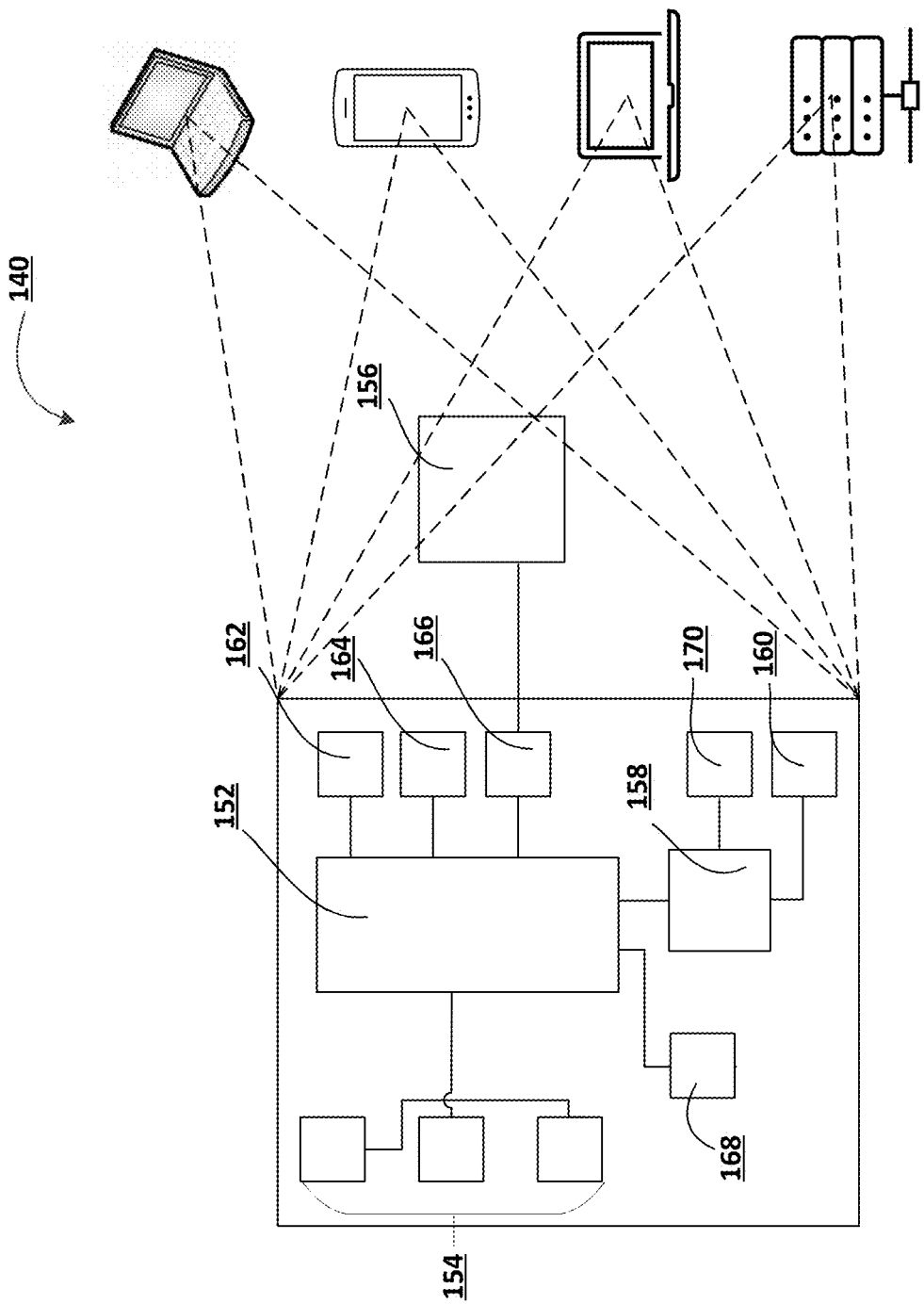
Figure 2:
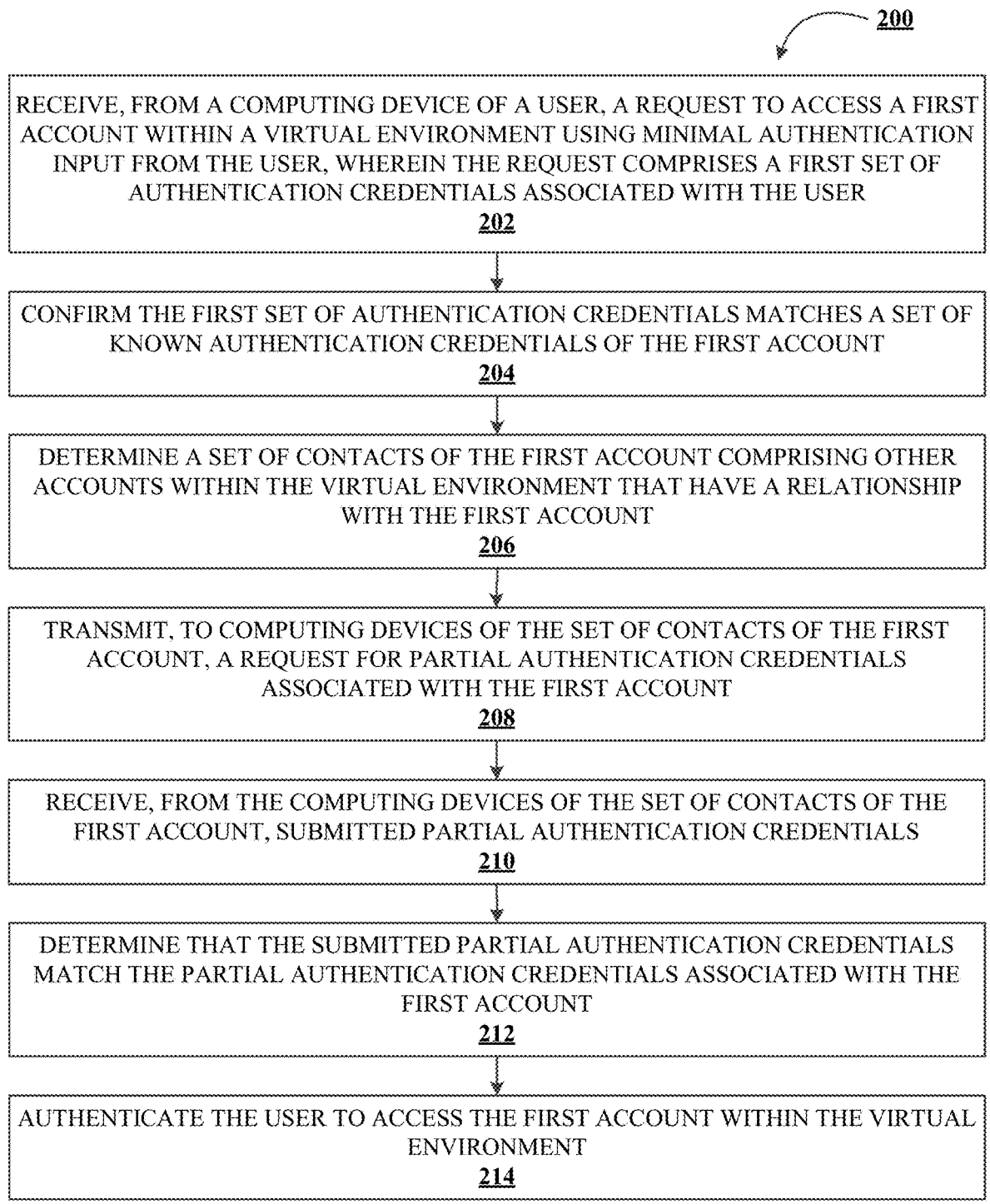
Figure 3:
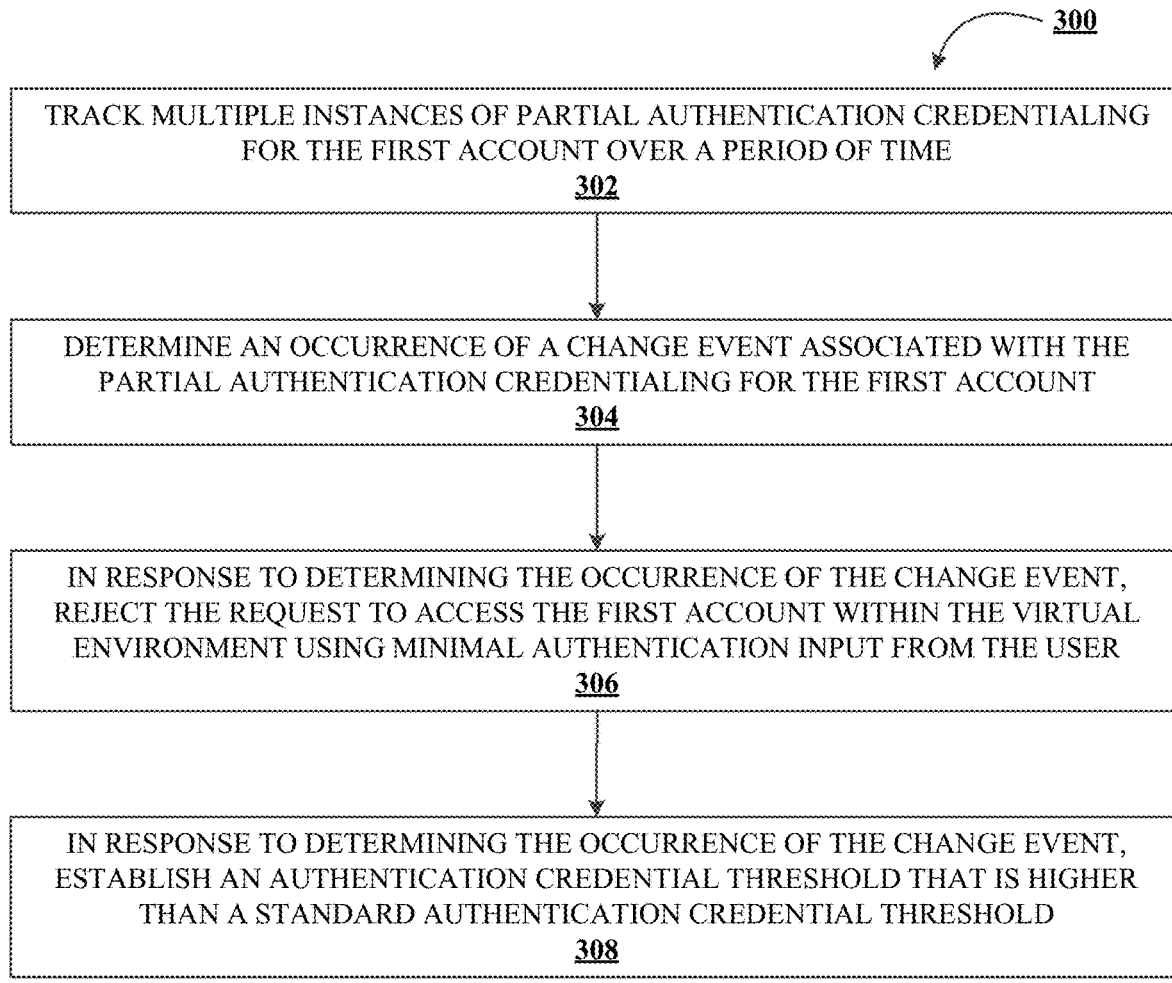

Having thus described embodiments of the invention in general terms, reference will now be made the accompanying drawings, wherein:

FIGS. 1A-1C illustrates technical components of an exemplary distributed computing environment for partial pool credentialling authentication, in accordance with an embodiment of the invention;

FIG. 2 illustrates a process flow for partial pool credentialling authentication, in accordance with an embodiment of the invention; and FIG. 3 illustrates a process flow for partial pool credentialling authentication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Partial pool credentialling authentication, as described herein, enables users to delegate portions of their authentication process to their contacts, friends, and the like, permitting these contacts to vouch for the user's identity without revealing the user's full credentials.

This process is desirable to users for situations where a user would like to have an alternative authentication method (as opposed to a typical authentication method like two-factor authentication) when authenticating for significant purposes, or if the user would like to have a backup authentication method that relies on the strength of the knowledge, awareness, and trust of the user's contacts (e.g., friends, relatives, co-workers, friends, and the like). By delegating substantial portions of the authentication of the user to a group of the user's contacts, the user can avoid revealing their full credentials, or can reduce or eliminate the need for the user to reveal their full credentials to multiple parties.

The ability to give the user the ability to only provide a limited amount of credentials improves the security of the user's sensitive information that would otherwise be contained in a standard authentication process.

From the user's perspective, the solution described herein would involve the user providing their full credentials such as a username and password, email address, and the like, as part of an initial application, initial initiation, or other initial interaction with a service or application (e.g., to access a virtual environment like a metaverse, to access a financial account within the metaverse, to access a specific application within a virtual environment, to access a social media environment, or the like). The user could then generate one or more partial credentials that can be shared with the user's contacts (either through a virtual environment or separately, outside of the virtual environment). For example, the user could generate a partial credential security prompt and response for granting the user access to an account that stores resources within a metaverse, and then share that response to the prompt with the user's contact outside of the virtual environment. The user's contact will not have enough of the user's authentication credentials to access the user's account, but the contact will now have the information needed to confirm whether the user is the person requesting access to the account (e.g., to vouch for the user's identity).

As this partial credentialling authentication system may be taking place within a metaverse environment, the user's contacts themselves may need to verify their identity with the credentialling system before providing partial credentials on behalf of the user (or before such provision would be accepted by the credentialling system). Therefore, each contact may also have authentication credentials associated with the virtual environment that are verified prior to the partial credentialling authentication system described herein.

The partial credentials can be several different types of information. For example, the partial credentials could be user-generated one-time codes (e.g., PIN number, passcode, time-changing code, or the like) that the contact(s) would enter into the partial credentialling authentication system when prompted. Additionally or alternatively, the partial credentials may comprise a shared secret, like a secret phrase, a secret word, a secret number or set of alphanumeric characters, or the like. In embodiments with multiple contacts, each contact may be aware of a portion of the secret credentials, such that each contact can provide a portion of the authentication information without any contact having enough information to provide the whole (non-partial) authentication credentials of the user. This protects the user from unintentionally granting the user's contacts with access to the user's accounts or resources within the virtual environment.

Partial credentials could also be a digital certificate associated with the user and/or each contact of the user that may provide partial credentials in the future. For example the system may receive identity of device identity information of the user and a contact, create a digital hash based on the received identity information, and then use that digital hash in the future for partial credential authentication purposes. Similarly, the system may utilize biometric data of a contact as the partial credential.

The user may also designate specific types of partial credentials for specific contacts, such that the contact will independently understand and know to use the designated type of partial credentials to assist the user in the authentication process. For example, the user may designate a first contact to provide partial authentication credentials of the user by accessing a first authentication application on the contact's computing device and entering a passcode associated with first contact's confirmation of the user's identity. Subsequently, when the partial pool authentication credentialling system transmits a prompt to the first contact, the prompt may simply request that the first contact provide partial authentication credentials for the user but would not include an input field, or otherwise instruct the first contact on how to authenticate the user. The first contact would then know to access the respective authentication application on the first contact's computing device and enter the passcode associated with the confirmation of the user's identity.

There may be different levels or thresholds of partial credential authentication, which may depend on the degree of sensitive information that would be accessed by the user's authentication, or based on a known or suspected compromise of security for the user and/or the pool of contacts that may provide partial credentials for the user. For example, for a user to access a social media application within a virtual environment that does not include the ability to access financial resources or sensitive information for the user, then the threshold of partial credential authentication may be relatively low, with only two contacts each providing the same 4-digit code to verify the identity of the user.

However, if the user is attempting to access a financial resource account within the virtual environment in a manner that could permit the person accessing the account to transfer resources to other accounts, then the system may require a higher threshold for partial credential authentication. For example, the system may require that five contacts of the user provide partial credentials that are unique to each of the five contacts. This would require five individuals to independently verify the user's identity or authorization to access the financial resource account within the virtual environment, which would be difficult for one or two individuals to independently accomplish.

Accordingly, as part of the present invention, the partial pool credentialing authentication system first receives a request from a user to access a virtual account or virtual resource within a virtual environment (e.g., the metaverse). The request includes only a limited amount of authentication credentials of the user (i.e., not enough to otherwise satisfy a "no trust" authentication system). Once the system confirms the limited credentials are accurate with respect to the user, the system determines a set of contacts that have a relationship of the user's account within the virtual environment (e.g., designated as friends, trusted friends, close connections, or co-workers of the user or the user's virtual account).

The system then transmits a request to each of these contacts to provide certain supplemental authentication credentials associated with the user. The responses from these contacts are compared to known authentication credential characteristics of the user. If the supplemental credentials are accurate, then the user is granted access to the virtual account. Additionally or alternatively, if the supplemental credentials are not accurate, then the user is denied access to the virtual account, and separate or additional authentication credentials may be requested of the user or the contacts.

The system can also provide long-term analysis of the above-described single instances of the partial pool credential authentication process. For example, over time, the user may analyze the partial pool authentication process for users and their contacts and identify patterns or otherwise detect gaps in the authentication process to predictively identify scenarios where the authentication process (or specific accounts) may be compromised.

In response to detecting potential compromised accounts, the system can either: (1) prevent partial pool credentialling to authenticate an affected user; (2) exclude affected contacts from the partial pool credentialling process; (3) require the user and/or the contacts to provide additional credential information; or (4) require the user and/or the contacts to provide credential information at a higher security threshold.

What is more, the present invention provides a technical solution to a technical problem. As described herein, the technical problem includes a mechanism to protect the user's personal and/or sensitive information from being used frequently within a virtual environment like the metaverse, while still providing a high level of authentication security. The technical solution presented herein allows for the distribution of authentication credentials across multiple contacts (e.g., friends, relatives, or co-workers) of a user, thereby requiring a pool of multiple contacts to each affirm the identity of the user and/or confirm the user's right to access the application, account, or other system within a virtual environment. In particular, partial pool credentialing authentication system is an improvement over existing solutions to the user authentication process, providing a more secure solution to problem, thus reducing the likelihood of an unauthorized individual from accessing sensitive information of the user while also protecting the user's sensitive credentials from being communicated (and therefore stored and analyzed) on a frequent basis. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for partial pool credentialling authentication 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 106, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Referring now to FIG. 2, a flowchart is provided to illustrate one embodiment of a process 200 for system for partial pool credentialling authentication, in accordance with embodiments of the invention. In some embodiments, the process 200 may include block 202, where the system receives, from a computing device of a user, a request to access a first account within a virtual environment using minimal authentication input from the user, wherein the request comprises a first set of authentication credentials associated with the user.

The first set of authentication credentials associated with the user comprise one or more of a username for the first account, a personal identification number associated with the first account, contact information associated with the first account, a prompt for one or more of the set of contacts of the first account to respond to.

In some embodiments, the process 200 includes block 204, where the system confirms the first set of authentication credentials matches a set of known authentication credentials of the first account.

Additionally, in some embodiments, the process 200 includes block 206, where the system determines a set of contacts of the first account comprising other accounts within the virtual environment that have a relationship with the first account The process 200 may also include block 208, where the system transmits, to computing devices of the set of contacts of the first account, a request for partial authentication credentials associated with the first account.

The partial authentication credentials may, in some embodiments, comprise one or more of a personal identification number associated with the first account, contact information associated with the first account, a prompt for one or more of the set of contacts of the first account to respond to, a response to a prompt provided by the user, acknowledgement or rejection of a previous interaction within the virtual environment between the first account and one or more of the set of contacts of the first account.

In some embodiments, the process 200 includes block 210, where the system receives, from the computing devices of the set of contacts of the first account, submitted partial authentication credentials.

Additionally, in some embodiments, the process 200 includes block 212, where the system determines that the submitted partial authentication credentials match the partial authentication credentials associated with the first account.

Finally, the process 200 may continue to block 214, where the system authenticates the user to access the first account within the virtual environment.

Referring now to FIG. 3, a flowchart is provided to illustrate one embodiment of a process 300 for system for partial pool credentialling authentication, in accordance with embodiments of the invention. In some embodiments, the process 300 may include block 302, where the system tracks multiple instances of partial authentication credentialing for the first account over a period of time.

In some embodiments, the process 300 includes block 304, where the system determines an occurrence of a change event associated with the partial authentication credentialing for the first account.

The change event may, in some embodiments, comprise a change in the set of contacts of the first account providing the supplemental credentials.

The change event may, in some embodiments, comprise a detection of a potentially compromised account associated with one of the set of contacts of the first account.

Additionally, in some embodiments, the process 300 includes block 306, where, in response to determining the occurrence of the change event, the system rejects the request to access the first account within the virtual environment using minimal authentication input from the user.

Finally, the process 300 may continue to block 308, where, in response to determining the occurrence of the change event, the system establishes an authentication credential threshold that is higher than a standard authentication credential threshold the system.

Establishing an authentication credential threshold that is higher than a standard authentication credential threshold may, in some embodiments comprise expanding a number of contacts in the set of contacts of the first account to provide partial credentials.

Additionally or alternatively, establishing an authentication credential threshold that is higher than a standard authentication credential threshold may comprise requiring the set of contacts of the first account to provide additional or more rigorous partial credentials.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for partial pool credentialling authentication, the system comprising:
    at least one non-transitory storage device;
    at least one processor coupled to the at least one non-transitory storage device; and
    computer program code comprising computer instructions configured to cause said at least one processor to perform the following operations:
        receive, from a computing device of a user, a request to access a first account within a virtual environment using first authentication input from the user, wherein the request comprises a first set of authentication credentials associated with the user, wherein the first set of authentication credentials is less than a full set of authentication credentials required for standalone access to the first account within the virtual environment;
        confirm the first set of authentication credentials matches a set of known authentication credentials of the first account;
        determine a set of contacts of the first account comprising a subset of other accounts within the virtual environment that have a relationship with the first account, wherein a number of contacts in the set of contacts of the first account is defined by a standard authentication credential threshold;
        determine an occurrence of a change event associated with a partial pool authentication credentialing for the first account, based on multiple instances of partial pool authentication credentialing for the first account tracked over a period of time;
        in response to determining the occurrence of the change event, establish an authentication credential threshold that is higher than the standard authentication credential threshold, wherein establishing the authentication credential threshold that is higher than the standard authentication credential threshold comprises increasing a number of contacts in the set of contacts of the first account to provide partial credentials;
        transmit, to computing devices of the set of contacts of the first account, a request for partial authentication credentials associated with the first account;
        receive, from the computing devices of the set of contacts of the first account, submitted partial authentication credentials;
        determine that the submitted partial authentication credentials match the partial authentication credentials associated with the first account; and
        authenticate the user to access the first account within the virtual environment, based on confirming that the first set of authentication credentials and a combined partial authentication credentials satisfies an authentication requirement to satisfy access to the first account within the virtual environment.

2. The system of claim 1, wherein the first set of authentication credentials associated with the user comprise one or more of a username for the first account, a personal identification number associated with the first account, contact information associated with the first account, a prompt for one or more of the set of contacts of the first account to respond to.

3. The system of claim 1, wherein the submitted partial authentication credential comprises one or more of a personal identification number associated with the first account, contact information associated with the first account, a prompt for one or more of the set of contacts of the first account to respond to, a response to a prompt provided by the user, acknowledgement or rejection of a previous interaction within the virtual environment between the first account and one or more of the set of contacts of the first account.

4. The system of claim 1, wherein the change event comprises a change in the set of contacts of the first account providing the supplemental credentials.

5. The system of claim 1, wherein the change event comprises a detection of a potentially compromised account associated with one of the set of contacts of the first account.

6. The system of claim 1, wherein the computer instructions are further configured to cause said at least one processor to perform the following operation:
    in response to determining the occurrence of the change event, reject the request to access the first account within the virtual environment using the first authentication input from the user.

7. The system of claim 1, wherein establishing an authentication credential threshold that is higher than a standard authentication credential threshold comprises requiring the set of contacts of the first account to provide additional or more rigorous partial credentials.

8. A computer program product for partial pool credentialling authentication, the computer program product comprising a non-transitory computer-readable medium comprising code causing an apparatus to:
    receive, from a computing device of a user, a request to access a first account within a virtual environment using first authentication input from the user, wherein the request comprises a first set of authentication credentials associated with the user, wherein the first set of authentication credentials is less than a full set of authentication credentials required for standalone access to the first account within the virtual environment;

confirm the first set of authentication credentials matches a set of known authentication credentials of the first account;

determine a set of contacts of the first account comprising a subset of other accounts within the virtual environment that have a relationship with the first account, wherein a number of contacts in the set of contacts of the first account is defined by a standard authentication credential threshold;

determine an occurrence of a change event associated with a partial pool authentication credentialing for the first account, based on multiple instances of partial pool authentication credentialing for the first account tracked over a period of time;

in response to determining the occurrence of the change event, establish an authentication credential threshold that is higher than the standard authentication credential threshold, wherein establishing the authentication credential threshold that is higher than the standard authentication credential threshold comprises increasing a number of contacts in the set of contacts of the first account to provide partial credentials;

transmit, to computing devices of the set of contacts of the first account, a request for partial authentication credentials associated with the first account;

receive, from the computing devices of the set of contacts of the first account, submitted partial authentication credentials;

determine that the submitted partial authentication credentials match the partial authentication credentials associated with the first account; and authenticate the user to access the first account within the virtual environment, based on confirming that the first set of authentication credentials and a combined partial authentication credentials satisfies an authentication requirement to satisfy access to the first account within the virtual environment.

9. The computer program product of claim 8, wherein the first set of authentication credentials associated with the user comprise one or more of a username for the first account, a personal identification number associated with the first account, contact information associated with the first account, a prompt for one or more of the set of contacts of the first account to respond to.

10. The computer program product of claim 8, wherein the submitted partial authentication credential comprises one or more of a personal identification number associated with the first account, contact information associated with the first account, a prompt for one or more of the set of contacts of the first account to respond to, a response to a prompt provided by the user, acknowledgement or rejection of a previous interaction within the virtual environment between the first account and one or more of the set of contacts of the first account.

11. A method for partial pool credentialling authentication, the method comprising:

receiving, from a computing device of a user, a request to access a first account within a virtual environment using first authentication input from the user, wherein the request comprises a first set of authentication credentials associated with the user, wherein the first set of authentication credentials is less than a full set of authentication credentials required for standalone access to the first account within the virtual environment;

confirming the first set of authentication credentials matches a set of known authentication credentials of the first account;

determining a set of contacts of the first account comprising a subset of other accounts within the virtual environment that have a relationship with the first account, wherein a number of contacts in the set of contacts of the first account is defined by a standard authentication credential threshold;

determining an occurrence of a change event associated with a partial pool authentication credentialing for the first account, based on multiple instances of partial pool authentication credentialing for the first account tracked over a period of time;

in response to determining the occurrence of the change event, establishing an authentication credential threshold that is higher than the standard authentication credential threshold, wherein establishing the authentication credential threshold that is higher than the standard authentication credential threshold comprises increasing a number of contacts in the set of contacts of the first account to provide partial credentials;

transmitting, to computing devices of the set of contacts of the first account, a request for partial authentication credentials associated with the first account;

receiving, from the computing devices of the set of contacts of the first account, submitted partial authentication credentials;

determining that the submitted partial authentication credentials match the partial authentication credentials associated with the first account; and authenticating the user to access the first account within the virtual environment, based on confirming that the first set of authentication credentials and a combined partial authentication credentials satisfies an authentication requirement to satisfy access to the first account within the virtual environment.

12. The method of claim 11, wherein the first set of authentication credentials associated with the user comprise one or more of a username for the first account, a personal identification number associated with the first account, contact information associated with the first account, a prompt for one or more of the set of contacts of the first account to respond to.

13. The method of claim 11, wherein the submitted partial authentication credential comprises one or more of a personal identification number associated with the first account, contact information associated with the first account, a prompt for one or more of the set of contacts of the first account to respond to, a response to a prompt provided by the user, acknowledgement or rejection of a previous interaction within the virtual environment between the first account and one or more of the set of contacts of the first account.

\* \* \* \* \*